United States Patent
Föhl

[11] Patent Number: 5,358,275
[45] Date of Patent: Oct. 25, 1994

[54] ENERGY CONVERTER IN A RESTRAINING SYSTEM FOR VEHICLE OCCUPANTS

[75] Inventor: Artur Föhl, Schorndorf, Fed. Rep. of Germany

[73] Assignee: TRW Repa GmbH, Alfdorf, Fed. Rep. of Germany

[21] Appl. No.: 19,420

[22] Filed: Feb. 19, 1993

[30] Foreign Application Priority Data

Feb. 27, 1992 [DE] Fed. Rep. of Germany ....... 4206093

[51] Int. Cl.5 .............................................. B60R 22/36
[52] U.S. Cl. ...................................... 280/806; 60/635;
188/374; 297/480
[58] Field of Search ............... 280/806, 801 R;
297/480; 188/371, 374, 377; 60/632, 635, 638

[56] References Cited

U.S. PATENT DOCUMENTS

| | | | |
|---|---|---|---|
| 3,583,530 | 6/1971 | De Venne | 297/386 |
| 3,604,285 | 9/1971 | Olsson | 188/371 |
| 3,917,031 | 11/1975 | Doin et al. | 297/386 |
| 4,258,934 | 3/1981 | Tsuge et al. | 188/371 |
| 4,288,098 | 9/1981 | Tsuge et al. | 188/371 |
| 4,360,171 | 11/1982 | Reid et al. | 280/808 |
| 4,423,846 | 1/1984 | Fohl | 242/107 |
| 5,069,482 | 12/1992 | Fohl | |

FOREIGN PATENT DOCUMENTS

| | | |
|---|---|---|
| 422410 | 9/1990 | European Pat. Off. . |
| 1808044 | 10/1969 | Fed. Rep. of Germany . |
| 2138779 | 3/1973 | Fed. Rep. of Germany . |
| 2436754 | 3/1975 | Fed. Rep. of Germany . |
| 2349891 | 4/1975 | Fed. Rep. of Germany . |
| 2811694 | 9/1979 | Fed. Rep. of Germany ...... 280/806 |
| 2946717 | 6/1980 | Fed. Rep. of Germany . |
| 8900013 | 3/1989 | Fed. Rep. of Germany . |

*Primary Examiner*—Eric Culbreth
*Attorney, Agent, or Firm*—Tarolli, Sundheim & Covell

[57] ABSTRACT

In an energy converter in a restraining system for vehicle occupants a particularly smooth profile of the force as a function of the travel is achieved in that only a few deformation members are provided which effect a plastic deformation of a tubular converter body (10). As deformation member at least one ball (18) is provided which rests on a ramp face of a piston element (14).

2 Claims, 3 Drawing Sheets

U.S. Patent   Oct. 25, 1994   Sheet 1 of 3   5,358,275
Fig. 1
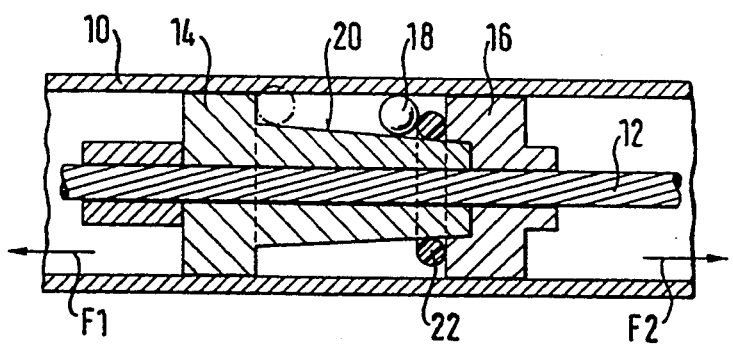
Fig. 2
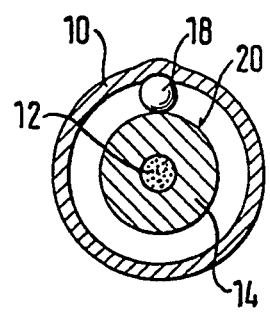
Fig. 3
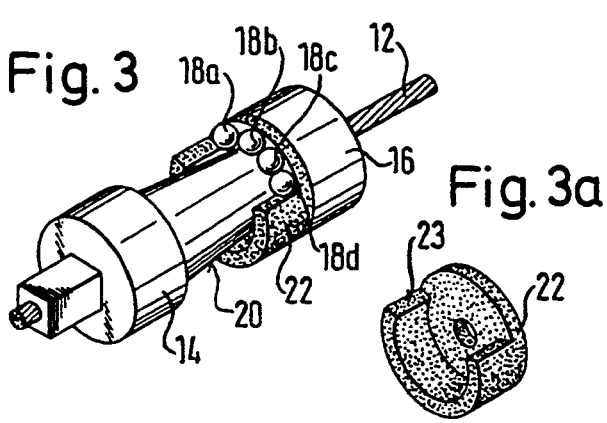
Fig. 3a
Fig. 4
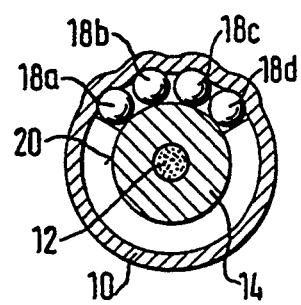
Fig. 5
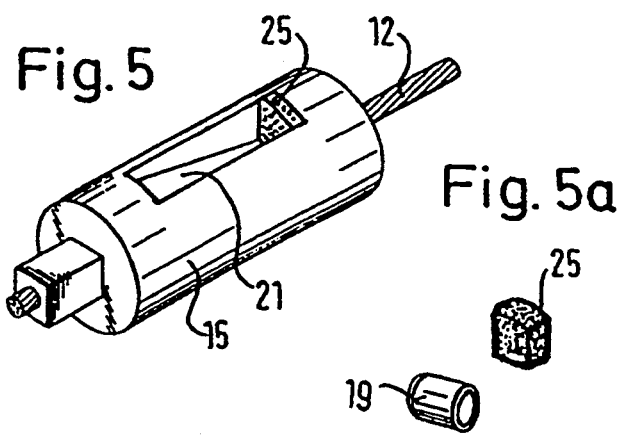
Fig. 5a
Fig. 6
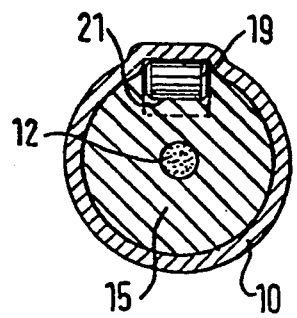

ENERGY CONVERTER IN A RESTRAINING SYSTEM FOR VEHICLE OCCUPANTS

BACKGROUND OF THE INVENTION

The present invention relates to an energy converter in a restraining system for vehicle occupants comprising a tubular converter body of plastically deformable material and a deforming means which is accommodated therein.

The purpose of such an energy transformer or converter is to diminish load peaks in a safety belt system which occur during the forward displacement of a vehicle occupant in a vehicle collision. The use of such an energy converter is particularly effective in combination with a belt pretensioner which eliminates the belt slack before the forward displacement of the vehicle occupant begins. An adequate movement travel is then available for the forward displacement of the vehicle occupant and the simultaneously occurring energy conversion.

Such an energy converter, which is also referred to as a force limiter, is described in EP 0 422 410 A 1. It consists of a cylinder of plastically deformable material in which a rod is received which projects at its one end out of the cylinder and its other end defines a free space in which a plurality of roller bodies are accommodated. The outer diameter of the ring arrangement formed by the roller bodies is greater that the inner diameter of the cylinder bore. Under a high tensile load between the cylinder and the rod the roller bodies penetrate into the material of the cylinder wall, performing deformation work with formation of longitudinal grooves; due to this work a high amount of energy is transformed and load peaks in the belt system are diminished.

The limitation of the load peaks occurring in the belt system which can be achieved with such an energy converter makes a substantial contribution to the reduction of the risk of injury, as can be proved with the aid of load measurements on so-called dummies. It has however been found that although the load peaks in the belt system can be limited by such an energy converter, they cannot be avoided.

SUMMARY OF THE INVENTION

The present invention provides an energy converter of the type referred to above, wherein any load peaks in the belt system are further reduced and almost eliminated, so that an almost constant load, or one which rises gradually in desired manner, occurs in the belt system.

According to the invention, the deformation member deforms the wall of the tubular converter body unsymmetrically on only one of two diametrically opposite sides. The construction of the energy converter according to the invention is designed for a force limitation to a level within a range of up to about 7000N. Forces in this range occur in the webbing section between the deflection fitting and belt retractor. When using an efficiently acting belt pretensioner values of only about 5000N at the most are achieved. The energy converter according to the present invention is therefore particularly intended for use on belt retractors having a belt pretensioner engaging the reel to the retractor.

The invention is based on the recognition that to avoid load peaks in the belt system it must be ensured that the energy conversion by plastic deformation of the material of the converter body takes place smoothly without jerks. To achieve this, it is favourable for the deformation members to penetrate into the material of the converter body appreciably deeper than the roller bodies of the known energy converter. The application of this knowledge leads to use of only a few deformation members which however must perform more deformation work. This then avoids the wall of the converter body initially yielding elastically and then being approximately polygonally deformed before the deformation members penetrate into the material of the wall of the converter body. It has been found that abrupt fluctuations of the travel-dependent force profile can be substantially avoided if a predominantly plastic deformation of the wall of the tubular converter body occurs and elastic deformations are extensively suppressed.

According to a first embodiment which is distinguished by a particularly smooth profile of the force as a function of the displacement travel, as deformation member at least one roller body in the form of a ball or roller is used, which is supported on its side remote from the wall of the converter body on a ramp face of a piston clement on which the pulling or thrust means engages.

According to a second embodiment in which the travel-dependent profile of the forces is likewise smooth, although not quite as smooth as in the previously mentioned embodiment, the deforming means comprises a plate which is pivotal between a rest position inclined to the axis of the converter body and an operating position in which it brings the deformation members formed at its radially outer ends into engagement with the inner side of the converter body and is supported with its radially oppositely disposed end slidingly on the inner side of the converter body. This embodiment is distinguished by constructional simplicity and low manufacturing costs.

Various further developments of these two embodiments are set forth in the subsidiary claims.

BRIEF DESCRIPTION OF THE DRAWINGS

Further features and advantages of the invention will be apparent from the following description of several embodiments and from the drawings, to which reference is made and in which:

FIG. 1 shows a schematic partial longitudinal section of a first embodiment of an energy converter;

FIG. 2 shows a cross-section of the energy converter shown in FIG. 1 after plastic deformation of the tubular converter body has occurred;

FIG. 3 shows a perspective view of a second embodiment in which the tubular converter body has been omitted;

FIG. 3a shows a perspective view of a guide member in the embodiment shown in FIG. 3;

FIG. 4 shows a cross-section of the energy converter shown in FIG. 3 after plastic deformation of the tubular converter has occurred;

FIG. 5 shows a perspective view of a further embodiment of the energy converter with the tubular converter body omitted;

FIG. 5a shows a perspective view of an elastic plate for the embodiment according to FIG. 5;

FIG. 6 shows a cross-sectional view of the embodiment of the energy converter shown in FIG. 5 after plastic deformation of the tubular converter body has occurred;

DESCRIPTION OF PREFERRED EMBODIMENTS

Figure 7:
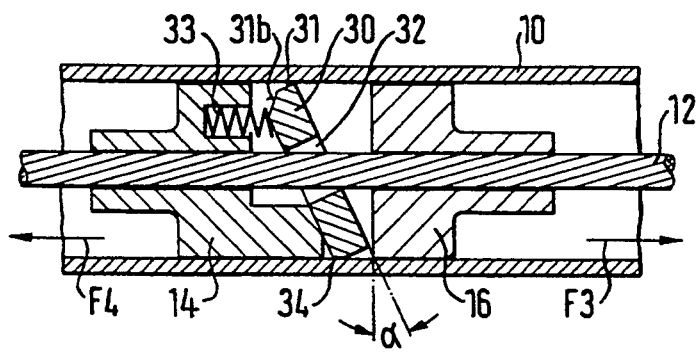
FIG. 7 shows a schematic partial longitudinal section of a further embodiment of the energy converter.

In a tubular converter body 10 of circular cross-section a deforming means is arranged on a pulling cable 12 and comprises two piston elements 14, 16 secured behind each other on the pulling cable 12 and a ball 18 which rests on a conical ramp face 20 of the piston member 14 is held in a rest position at the bottom of the ramp face 20 by a guide member 22 of resilient material and resiliently in contact with the inner side of the wall of the tubular converter body 10. The piston elements 14, 16, which may also be formed in one piece as a piston, are displaceable in the tubular converter body 10. In the embodiment illustrated the guide member 22 consists of an O-ring which surrounds the conical ramp 20 at the end thereof of smallest diameter and bears on the shoulder formed by the piston element 16.

The piston/cylinder means shown in FIG. 1 may form at the same time the linear drive of a belt pretensioner engaging the belt reel of a belt retractor. In such a construction the piston element 16 is subjected in the cylinder formed by the tubular converter body 10 to the pressure of the gases generated by a pyrotechnical gas generator, so that the piston elements 14, 16 are displaced in FIG. 1 in the direction of an arrow F1 in the interior of the tubular converter body 10, the pulling cable 12 being entrained and engaging in a manner known pre se on the periphery of a pulley which is adapted to be coupled to the belt reel of the belt retractor. After belt tightening has been effected by turning of the belt reel the forward displacement of the vehicle occupant secured by the belt system begins, a tension being exerted on the piston elements 14, 16 via the pulling cable 12 in the direction of the arrow F2 in FIG. 1. The ball 18, which permits free movement of the piston elements 14, 16 in the direction of the arrow F1 is held by the guide member 22 resiliently in engagement with the inner side of the wall of the tubular converter body 10 and now comes into engagement with said wall when the movement in the direction of the arrow F2 takes place because it is pressed radially outwardly by the ramp face 20. The ball 18 now penetrates smoothly and progressively into the material of the wall of the tubular converter body 10, leading to a plastic deformation of said wall. This state of a plastic deformation is illustrated in FIG. 2. The piston elements 14, 16, which may also be made in one piece with each other, bear on their side opposite the ball 18 slidingly on the inner side of the wall of the tubular converter body 10. To promote as uniform a displacement as possible and a smooth conversion process, it is expedient to apply a lubricant to the inner side of the wall of the tubular converter body 10 so that the sliding friction between the piston elements 14, 16 and said wall is reduced.

Figure 15A:
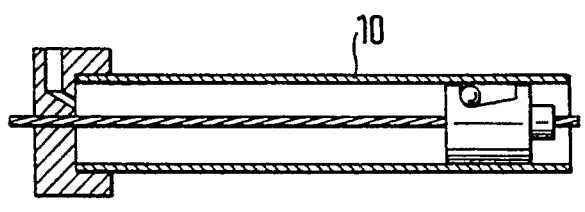
FIG. 15a to 15c show three embodiments of the energy converter with different configurations of the tubular converter body.
Figure 16A:
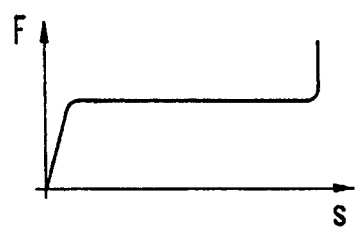
FIGS. 16a to 16c show diagrams which illustrate the profile of the force as a function of the travel for the embodiments according to FIGS. 15a to 15c.

If the wall thickness of the tubular converter body 10 is constant as illustrated in FIG. 15a, the profile of the force F shown in the diagram of FIG. 16a as a function of the travel S results. The force F is the force which must be exerted in the displacement of the piston elements 14, 16 with the ball 18 in the tubular converter body 10 and the travel distance S is that of the displacement of said piston elements with the ball 18 in the interior of the converter body 10. As apparent from FIG. 16a, the force F starts from zero and increases smoothly up to a maximum value which is reached after only a fraction of the total travel available. It should be particularly noted that the profile of the force F is largely free from peaks and troughs. It is here that the energy converter according to the invention differs very considerably from the prior art comprising a plurality of balls, which penetrate only slightly into the material of the converter body. In the embodiment shown in FIG. 15a and having a constant wall thickness of the converter body 10, the force F thereafter remains almost constant until the end stop of the converter body 10 is reached.

Figure 15B:
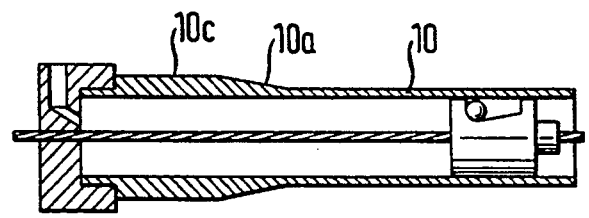
Figure 16B:
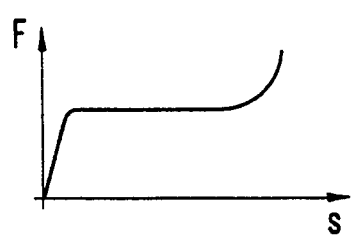
Figure 15C:
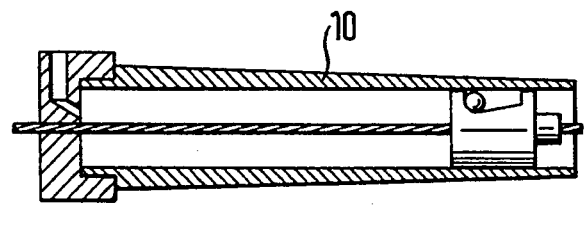

In the embodiment shown in FIG. 15b the wall thickness of the converter body 10 is constant over about half its length and then increases in a portion 10a gradually to about twice the value, thereafter remaining constant in a portion 10c. FIG. 16b shows the associated profile of the force F as a function of the travel S. In contrast to FIG. 16a, the force F increases after passing through about half the travel S and reaches its maximum value just before the end of the converter body.

Figure 16C:
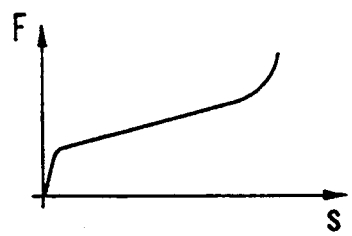

In the embodiment according to FIG. 16<: the wall thickness of the converter body 10 increases gradually from the start thereof to the end thereof. FIG. 16c shows the associated profile of the force F as a function of the travel S. As can be seen, the force F increases initially relatively steeply and then progressively, gradually assuming a maximum value in the region of the stop at the end of the converter body 10.

By suitable dimensioning of the wall thickness of the converter body 10 over the length thereof, almost any desired profile, suitable for a specific use of the force F as a function of the travel S can be achieved. In all projections it can be seen that the force profile is completely free of pronounced peaks or troughs, thereby very considerably diminishing the risk of injury.

The embodiment shown in FIGS. 3, 3a and 4 differs from that according to FIGS. 1 and 2 in that instead of one ball, four adjacently disposed ball 18a, 18b, 18c, 18d are present. The guide member 22 is of partially cylindrical form with a cutout 23 in which the balls 18a to 18d are received. The number of balls is governed by the level of the force F desired in the energy conversion (FIGS. 16a to 16c). In this embodiment as well the principle that as few balls as possible be used to avoid elastic deformations of the converter body 10 applies.

In the embodiment according to FIGS. 5, 5a, and 6 instead of a ball a roller 19 is used which rests on a planar ramp face 21 of a piston element 15 and abuts on a plate 25 at the lowest point of the ramp face 21 and therefore is resiliently in contact with the inner side of the wall of the tubular converter body 10. The ramp face 21 is formed at the bottom of a groove recessed in the piston element 15. By the side walls of the groove the roller 19 is held in a favourable rest position for the start of the deformation work. For to avoid low peaks it is important for the roller 19 to be brought uniformly and smoothly into engagement with the inner side of the tubular converter body 10.

A further optimizing is achieved in that the roller 19 is provided at its axial end faces with a rounded transition to the outer surface. The radius of the rounded portion, depending on the material and size of the converter body 10, is between 0.5 and 1 mm, preferably, 0.7 to 0.9 mm, and specifically 0.8 min. This rounding ensures that the roller 19 with its ends comes gently into engagement with the inner side of the converter body 10 in a cutting or chip-removing manner.

In the embodiments now to be described with reference to FIGS. 7 to 14 a deforming means in the form of a plate 30 is arranged between the piston elements mounted spaced apart on the pulling cable. Said plate 30 has a central cutout 32 for the passage of the pulling cable 12. The piston element 14 is made wedge-shaped on its side facing the plate 30 and has a bore in which a pressure spring 33 is received which bears on the adjacent end of the plate 30. The plate 30 is held by the piston element 14 and the pressure spring 33 in a rest position inclined to the axis of the converter body 10 at an angle α of about 30°, being held at its end 31, on which a projection 31a is formed, in engagement with the inner side of the wall of the converter body 10 and bearing slidingly at its opposite end 33 on the inner side of the converter body 10. As can be seen from FIGS. 7 and 9, the projection 31a has a chamfer 31b which ensures a gentle penetration into the material of the wall of the converter body without chip formation or cutting effect.

Figure 8:
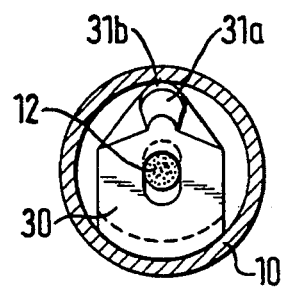
FIG. 8 shows a cross-section of the embodiment shown in FIG. 7.

FIG. 8 shows the state of the energy converter before a plastic deformation of the tubular converter body 10.

The mode of operation of the embodiment having a plate 30 instead of the balls 18 or roller 19 is fundamentally the same as that of the embodiments previously described. On movement of the piston elements 14, 16 in the direction of an arrow F3 in FIG. 7, the plate 30 remains in its inclined rest position. In contrast, when via the pulling cable 12 a tension is exerted on the piston elements 14, 16, in the direction of an arrow F4 in FIG. 7, the plate 30, which is held with its projections 31a resiliently in engagement with the inner side of the wall of the converter body 10, straightens up and penetrates with said projections 31 a into the material of the wall of the converter body 10.

Figure 9:
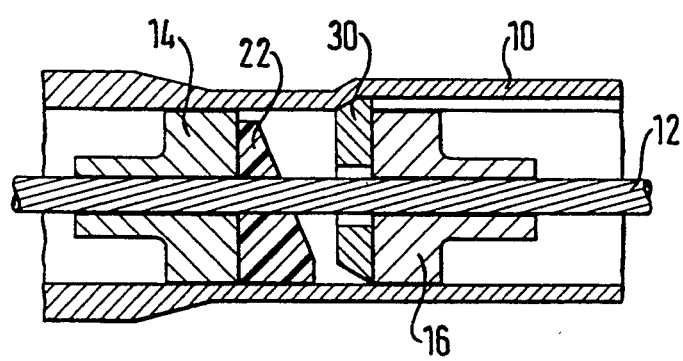
FIGS. 9 and 10 show views analogous to FIGS. 7 and 8 but after plastic deformation of the tubular converter body has occurred.
Figure 10:
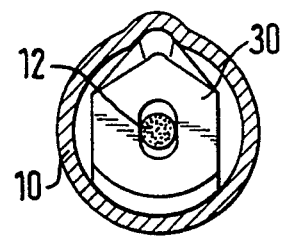

The embodiment according to FIGS. 9 and 10 differs from that according to FIGS. 7 and 8 only in the configuration of the means by which the plate 30 is held in its rest position. In this case said means are formed by a wedge-shaped guide member 22 of elastic material. This fulfills the same function as the wedge-shaped configuration of the piston element 14 in conjunction with the pressure spring 33 in the embodiment according to FIGS. 7 and 8. Furthermore, in FIGS. 9 and 10 the state of a deformation of the tubular converter body 10 is illustrated. An analoguous deformation takes place in the embodiment according to FIGS. 7 and 8.

Figure 11:
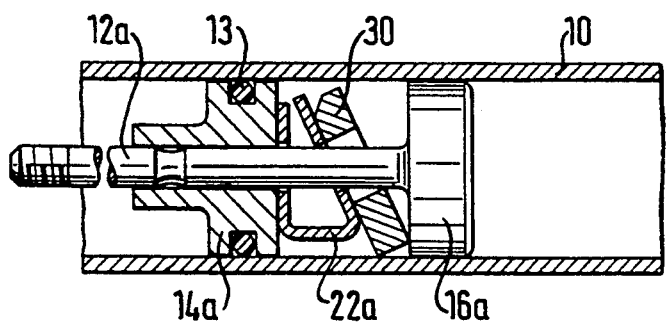
FIG. 11 shows a variant of the embodiment shown in FIGS. 7 to 10.
Figure 12:
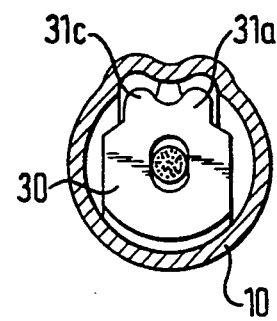
FIG. 12 shows a cross-section of the variant of the energy converter shown in FIG. 11 after plastic deformation of the tubular converter body has occurred.
Figure 13:
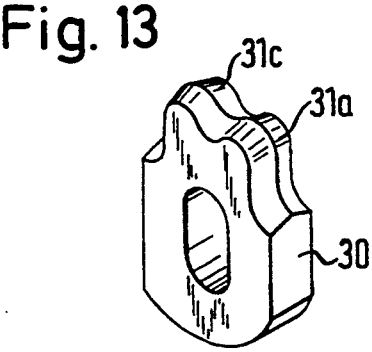
FIG. 13 shows a perspective view of a plate-like deforming means for the embodiment according to FIGS. 11 and 12.
Figure 14:
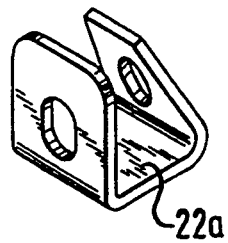
FIG. 14 shows a perspective detail view of a spring element according to FIG. 11.

In the embodiment according to FIG. 11 the plate 30 is provided with two adjacent projections 31a, 31c. It is held by means of a guide member 22a in an inclined rest position between two piston elements 14a, 16a. The piston elements 14a, 16a are mounted on a rigid rod 12a spaced from each other. The piston element 14a is formed at its periphery with a groove into which a sealing ring 15 is inserted. The guide member 22a, which is illustrated separately in perspective in FIG. 14, consists of a generally U-shaped bent spring metal plate with two openings for the passage of the rod 12a. It fulfills the same function as the guide member 22 in the embodiment according to FIGS. 9 and 10. The configuration of the plate 30 is shown separately in FIG. 13.

In the embodiments according to FIGS. 7 to 14 as well wall thickness of the converter body 10 is dimensioned in accordance with the principles which were explained with reference to FIGS. 15a to 16c.

I claim:

1. An energy converter in a restraining system for a vehicle occupant, comprising a tubular converter body with a wall of plastically deformable material and a piston which is slidingly accommodated therein and to which a pulling cable is connected, said piston supporting at least one deformation member adapted to move in said converter body in a predetermined direction and to engage said wall of said converter body and, on further displacement to deform said wall plastically, said deformation member deforms said wall asymmetrically on only one of two diametrically opposite sides, said deformation member is a plate having opposed ends adjacent said wall and provided with at least one engagement projection formed on one of said ends, said plate being pivotal between a rest position inclined to the axis of said converter body and an engaging position in which it brings said engagement projection into engagement with the inner side of said converter body and said plate having the other of said ends slidingly supported on the inner side of said converter body, wherein a pair of adjacent engagement projections are formed on said plate, said engagement projections being rounded at their radial ends.

2. An energy converter in a restraining system for a vehicle occupant, comprising a tubular converter body with a wall of plastically deformable material and a piston which is slidingly accommodated therein and to which a pulling cable is connected, said piston supporting at least one deformation member adapted to move in said converter body in a predetermined direction and to engage said wall of said converter body and, on further displacement to deform said wall plastically, said deformation member deforms said wall asymmetrically on only one of two diametrically opposite sides, said deformation member is a plate having opposed ends adjacent said wall and provided with at least one engagement projection formed on one of said ends, said plate being pivotal between a rest position inclined to the axis of said converter body and an engaging position in which it brings said engagement projection into engagement with the inner side of said converter body and said plate having the other of said ends slidingly supported on the inner side of said converter body, wherein said plate is held by an elastically deformable guide member in a rest position in which its plane is disposed inclined to the axis of said converter body.

* * * * *